US012781871B2

(12) United States Patent
Roether et al.

(10) Patent No.: US 12,781,871 B2
(45) Date of Patent: Nov. 3, 2026

(54) SOLENOID VALVE WITH IMPROVED MAGNETIC FLUX CONDUCTION, AND METHOD FOR PRODUCING SAME

(71) Applicant: Knorr-Bremse Systeme Fuer Nutzfahrzeuge GmbH, Munich (DE)

(72) Inventors: Friedbert Roether, Cleebronn (DE); Christoph Hoffmann, Gaufelden (DE); Kevin Kunert, Rutesheim (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 13 days.

(21) Appl. No.: 18/859,390

(22) PCT Filed: Mar. 31, 2023

(86) PCT No.: PCT/EP2023/058516
§ 371 (c)(1),
(2) Date: Oct. 23, 2024

(87) PCT Pub. No.: WO2023/208518
PCT Pub. Date: Nov. 2, 2023

(65) Prior Publication Data

US 2025/0264164 A1 Aug. 21, 2025

(30) Foreign Application Priority Data

Apr. 29, 2022 (DE) ..................... 10 2022 110 445.1

(51) Int. Cl.
*F16K 31/06* (2006.01)

(52) U.S. Cl.
CPC ...... *F16K 31/0675* (2013.01); *F16K 31/0606* (2013.01); *F16K 31/0627* (2013.01)

(58) Field of Classification Search
CPC ... F16K 1/36; F16K 1/46; F16K 1/485; F16K 31/0606; F16K 31/0627
See application file for complete search history.

(56) References Cited

U.S. PATENT DOCUMENTS 4,299,252 A * 11/1981 Reinicke ............ F16K 31/0606 335/229
4,922,965 A * 5/1990 Meister .............. F16K 31/0606 251/129.21
(Continued)

FOREIGN PATENT DOCUMENTS

DE 10251851 A1 2/2004
DE 102015005369 A1 10/2016
(Continued)

OTHER PUBLICATIONS

Machine translation of DE 10251851.*
(Continued)

*Primary Examiner* — Kevin F Murphy
(74) *Attorney, Agent, or Firm* — NORTON ROSE FULBRIGHT US LLP

(57) ABSTRACT

A solenoid valve having a first connection, a second connection, a third connection, and a core, in which the first connection is formed as a through-opening and which has an inner cone. The solenoid valve includes at least one closure part for opening and closing the first connection and the second connection; an armature for moving the at least one closure part; and a coil for moving the armature. The armature extends in a cylindrical manner about the at least one closure part and includes a section which protrudes axially beyond the at least one closure part and includes an end face that tapers in a conical manner and can be inserted into the inner cone of the core to conduct a magnetic flux current.

16 Claims, 2 Drawing Sheets

(56) References Cited

U.S. PATENT DOCUMENTS

| | | | | |
|---|---|---|---|---|
| 5,992,461 | A * | 11/1999 | Gilmore ............. | F16K 31/0627<br>251/129.21 |
| 7,503,115 | B2 * | 3/2009 | Daut ....................... | F01L 1/344<br>251/129.08 |
| 9,982,797 | B2 * | 5/2018 | Ye ....................... | F16K 31/0696 |
| 10,473,228 | B2 * | 11/2019 | Hutchins ................. | B60T 8/362 |
| 2020/0018417 | A1 | 1/2020 | Ho | |

FOREIGN PATENT DOCUMENTS

| | | | | |
|---|---|---|---|---|
| EP | 0418502 | A2 | 3/1991 | |
| WO | WO-2018103543 | A1 * | 6/2018 | ......... F16K 31/0675 |

OTHER PUBLICATIONS

Machine translation of WO 2018/103543.*

International Search Report for PCT/EP2023/058516, Issued Jun. 15, 2023.

* cited by examiner

SOLENOID VALVE WITH IMPROVED MAGNETIC FLUX CONDUCTION, AND METHOD FOR PRODUCING SAME

FIELD OF THE INVENTION

The present invention relates to a solenoid valve with improved magnetic flux conduction, and a method for producing same, and in particular to a ⅔-way valve with magnetic flux conduction via conical end faces.

BACKGROUND INFORMATION

Solenoid valves are used, for example, as ⅔-way valves for pressure control of anti-lock braking systems (ABS) or for traction control systems (ASR) in commercial vehicles or buses. These solenoid valves are subjected to intensive stress during operation and are intended to function reliably over many actuations.

Conventional solenoid valves, however, show significant wear over time due to the high stress such that reliable switching (opening and/or closing) is only insufficiently possible, if at all. In particular, due to the sudden switching operations and the high forces which occur in the process and which are caused, inter alia, by the pressure differences, mechanical abrasion of the valve seats and/or the closure parts frequently occurs. This wear may be further exacerbated by the air conduction, i.e. by the deflection of the air flows within the valve. In the case of conventional valves, it has been shown that the parts used can often only insufficiently withstand the strong air flows over the long term.

Therefore, there is a need for alternative configurations for solenoid valves, which make simple production possible and can ensure reliable operation throughout the entire service life.

At least some of the abovementioned problems may be solved by a solenoid valve as described herein and by a production method as described herein. The further descriptions herein define further advantageous embodiments of the subject matter of the main descriptions herein.

SUMMARY OF THE INVENTION

The present invention relates to a solenoid valve with a first port, a second port, a third port, and a core. The core comprises the first port as a through opening (e.g., as a valve seat) and is a conical depression (internal cone). The solenoid valve comprises at least one closure part for opening and closing the first port and the second port, an armature for moving the at least one closure part, and a coil for moving the armature. The armature extends cylindrically around the at least one closure part and comprises a portion protruding axially over the at least one closure part with a conically tapering end face. The conical end face is insertable into the internal cone of the core (during movement of the armature) in order to conduct a magnetic flux flow.

The armature has a portion protruding axially over the at least one closure part with an optional through opening or a slot. The armature may also have an axially running side channel (e.g. a groove) to conduct an air flow from the first port to the third port. In this way, the solenoid valve becomes a 3/2-way solenoid valve.

A through opening can be defined as a passage for an air flow, the passage having a closed edge in a cross section perpendicular to an air flow. It is therefore, for example, a bore or punched portion, rather than a notch or incision. The closure part can be in one part or multiple parts and can serve as a sealing member or sealing members and can reliably seal the corresponding valve seats. They may be flat or conically tapering to achieve a good seal. The direction of movement of the armature defines an axial direction.

The armature may then have a (partially) closed end face to the core. Optionally, the end face of the armature may form a cone. The core may optionally form an internal cone on the side facing the armature. This increases a magnetic area. The internal cone of the core and/or the cone of the armature can each be formed by two angled regions.

The following technical effects can be achieved with this configuration. Firstly, the conduction of the magnetic field lines changes. The double cone geometry of core and armature means that the magnetic force for small distances between armature and core tends to decrease, but increases at larger distances between core and armature. This has a positive effect on the switching behavior of the valve, since the valve can be reliably closed without excessive forces acting on the core when the closure part strikes against the valve seat. Compared to conventional armatures, which have a slotted armature geometry (i.e. no through holes), the magnetic force is therefore increased at larger distances, also because of the continuous end face of the armature toward the core. The closed pole surface on the armature generally increases the magnetic force, which also contributes to a safe movement of the armature through the coil. Overall, a higher magnetic force can thus be achieved by influencing the characteristic curve at larger distances between core and armature. This ensures that the armature moves through the coil even at larger distances between core and armature. It can thus be ensured that the magnetic force, even at a large distance, is greater than the spring force of the compression spring between the armature and core.

Optionally, the at least one closure part comprises a first closure part and a second closure part. The first closure part couples to the armature and, upon a movement of the armature, opens or closes the first port. The second closure part couples to the armature and, upon a movement of the armature, closes or opens the second port. The solenoid valve may then furthermore have at least one damping spring, which is arranged between the first closure part and the second closure part and is configured to cushion the closing of the first port and/or the second port.

The through opening may be a first through opening and the armature may optionally have a second through opening in a region which is formed axially between the first closure part and the second closure part to provide pressure compensation between an inner region of the cylindrical armature and the third port.

Optionally, the first through opening and the second through opening are structurally identical bores. Structurally identical may mean that they can be produced using the same tool (e.g. drill) and therefore-apart from the position-do not differ. Optionally, a plurality of first through openings and/or a plurality of second through openings may also be formed in order to distribute the air flow better.

Optionally, the first and the second closure part each have a head-shoulder region for closing the associated first or second port. The armature can have a protrusion projecting radially into the interior and, at an opposite end, an annular recess with a stop element. The protrusion can be configured to form a stop for the head-shoulder region of the first closure part. The recess can be configured in order to fix the second closure part with respect to the axial direction by the stop element after the first closure part, the damping spring and the second closure part have been inserted.

Optionally, the stop element is a disk which is fixed within the recess by edge compression of the armature. However, it does not have to be a continuous disk. It is sufficient if an axial stop is formed for the second closure part. However, it is not intended to be fully fixed.

The first closure part may also be structurally identical to the second closure part. This has the advantage that only one type of closure part needs to be produced. After being inserted, the two closure parts are twisted relative to each other just by 180°. This enables simple and cost-effective production. Only a damping spring needs to be arranged between the first closure part and the second closure part, said damping spring pushing the first closure part and the second closure part away from each other.

The solenoid valve can have a chamber into which the armature together with the at least one closure part are linearly movable, and the first, second and third ports provide a connection into the chamber (e.g., via external connection parts). In an energized state of the coil, the at least one closure part can close the first port and can produce a fluid connection between the second port and the third port via the chamber. In an unenergized state of the coil, the at least one closure part can close the second port and can produce a fluid connection between the first port and the third port via the chamber.

Exemplary embodiments also refer to a method for producing a previously defined solenoid valve which comprises a first port, a second port, a third port, an armature having a cylindrical interior, and a coil for moving the armature. According to exemplary embodiments, the method may furthermore comprise the following steps:

providing the armature with a side channel;

forming a through bore through the armature; and introducing at least one closure part into the armature, wherein, after the introducing step, the armature has a portion protruding axially over the at least one closure part, and the through bore is formed in the protruding portion in order to conduct an air flow from the first port to the third port.

Optionally, the through bore is a first through bore and the at least one closure part comprises a first closure part and a second closure part. The method can then furthermore comprise forming a second through bore in a region of the armature that lies axially between the first closure part and the second closure part. The same tool can be used in this case.

It is understood that all of the previously described features of the solenoid valve can be formed by further optional method steps. It is also understood that the sequence in which the steps are listed is not necessarily a sequence in which the method steps are executed. The steps may also be carried out in a different sequence or only some of the method steps are carried out Exemplary embodiments of the present invention overcome the problems mentioned at the beginning by using bores which can be formed in (only) one working step and do not impair the stability of the armature. In the case of slits and notches, it could be possible instead for a burr to form, which would have to be removed in complicated fashion.

If a plurality of closure parts are used, the (only) one spring affords the advantage that the striking of the two closure parts against the valve seats is damped. This is possible, for example, by the closure of the two ports taking place on opposite sides, which can be damped by a simple compression spring.

Exemplary embodiments also afford the advantage that the double damping significantly increases the service life of the solenoid valve. Less damage occurs, and the opening and closing is undertaken with a high degree of precision. Therefore, the solenoid valves are suitable for applications that require a high number of switching operations, as is the case with ABS solenoid valves, for example.

Another advantage of exemplary embodiments is that the two closure parts can have an identical configuration and can thus be manufactured interchangeably. This makes production much easier and cheaper. Cost savings are also achieved in that fewer parts are required as a result of double damping.

The same applies to the formation of the through openings, which can be formed by identical bores, since both the through opening in the central region between the two closure parts and in the upper end region can be produced in the same working step using the same tool. According to exemplary embodiments, the outer groove along the armature may already be present in the preliminary material (rod material), which also shortens the manufacturing process and the manufacturing time.

The exemplary embodiments of the present invention will be better understood from the following detailed description and the attached drawings of the various exemplary embodiments, which however are not intended to be understood such that they restrict the disclosure to the specific embodiments, but rather serve merely for the purposes of explanation and understanding.

DETAILED DESCRIPTION

Figure 1:
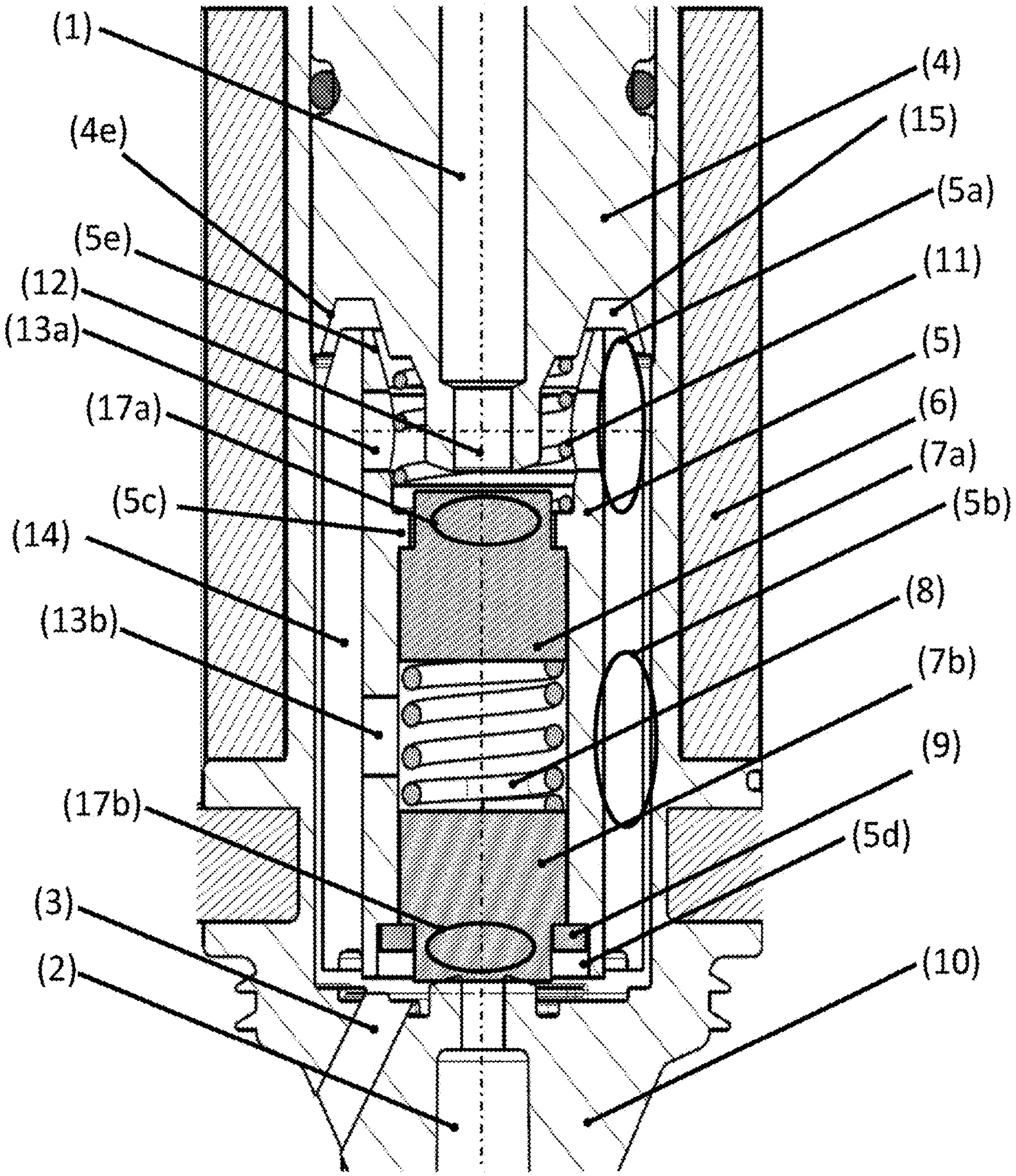
FIG. 1 shows a solenoid valve according to an exemplary embodiment of the present invention.

FIG. 1 shows a solenoid valve with improved damping according to an exemplary embodiment of the present invention. The valve shown is a 3/2-way valve, which can optionally connect three ports to each other by two switching positions. For this purpose, the solenoid valve comprises a first port 1, a second port 2, a third port 3, an armature 5, a coil 6, a first and a second closure part 7*a*, 7*b*, and a damping spring 8. The coil 6 is used to move the armature 5 (by magnetic forces). The first closure part 7*a* couples to the armature 5 and opens or closes the first port 1 when the armature 5 is moved through the coil 6. The second closure part 7*b* also couples to the armature 5 and opens or closes the second port 2 when the coil 6 moves the armature 5. The damping spring 8 is arranged between the first closure part 7*a* and the second closure part 7*b*. When the first port 1 is closed and/or when the second port 2 is closed, the damping spring 8 cushions the abutment (or impact) against the corresponding valve seat. It thus improves the damping and protects the closure parts 7*a*, 7*b* and the valve seats at the ports 1, 2.

The coil 6 may, for example, be accommodated in a valve body housing 10 and extend cylindrically around a core 4 and the armature 5. The core 4 may, for example, be arranged fixedly within the coil 6 and provide the first port 1 as a through opening. The armature 5 is displaceable in the axial direction (vertically in FIG. 1), wherein a compression spring 11 which generates a preload is present between the core 4 and the armature 5. The armature 5 may, for example, have a protruding portion 5*a*, which projects axially beyond the first closure part 7*a* and defines a cylindrical inner region in which the compression spring 11 is guided and which receives a valve seat 12 of the first port 1. A further advantage of the protruding portion 5*a* of the armature 5 is thus that the installation space for the compression spring 11 is thereby provided between the armature 5 and the core 4. This makes the assembly more compact. In the case of conventional solenoid valves, the compression spring is located on the outside of the armature and therefore requires additional installation space. Also, a long groove in the core 4 between the valve seat and the pole surface would be much more complicated in terms of manufacturing than the protruding portion 5*a* of the armature 5, as formed in exemplary embodiments.

The first and the second closure part 7*a*, 7*b* can move relative to the armature 5 by compressing the damping spring 8. However, this movement is limited axially in both directions by a stop. For this purpose, the first and second closure parts 7*a*, 7*b* each comprise a narrowed region 17*a*, 17*b*, which forms a shoulder-head region, wherein the head portion serves for closing the associated first or second opening 1, 2 and the shoulder serves as a stop.

In addition, the armature 5 comprises a protrusion 5*c* which protrudes radially into the interior and forms the stop for the shoulder portion 17*a* of the first closure part 7*a*. The compression spring 11 can also engage on said inner protrusion 5*c* and press the armature 5 away from the core 4. At an opposite end, an annular recess 5*d* is formed in the armature 5. The annular recess 5*d* is formed together with the head-shoulder region 17*b* of the second closure part 7*b* in such a way that an exemplary disk 9 can be used there, which is simply fixed, for example, by compression of the armature 5. The two closure parts 7*a*, 7*b* are then fixed by an axial stop in the armature 5.

When the coil 6 is in the unenergized state, the compression spring 11 pushes the armature 5 away from the core 4. The first closure part 7*a* thereby opens the first port 1, since the first closure part 7*a* is moved by the stop 5*c*. At the same time, the pretensioning force of the compression spring 11 is sufficient to move the armature 5 until the armature 5 closes the opposite second port 2 by the second closure part 7*b*. The placing of the second closure part 7*b* onto the second port 2 is damped via the damping spring 8.

When the coil 6 is energized and thus a magnetic field is generated, the armature 5 is magnetically pulled in the direction of the core 4 counter to the spring tension of the compression spring 11, until the first closure part 7*a* closes the first port 1. In this case, the stop transmits the force from the armature 5 through the disk 9 to the second closure part 7*b*, which transmits the force to the first closure part 7*a* via the damping spring 8. The compressive force when closing the first port 1 is thus limited to the spring force of the damping spring 8 and thus protects the solenoid valve.

As a result of this movement, either the second port 2 or the first port 1 is opened or closed. When the second port 2 is open (energized state), there is a fluid connection between the third port 3 and the second port 2. The third port 3 may be formed in a bottom portion of the valve body 10 next to the second port 2. No further measures for the air conduction between the second and third ports 2, 3 are then required.

FIG. 1 shows only the switching position with an open first port 1. For conducting the air flow from the first port 1 into the interior of the valve housing 10, the armature 5 has at least two through openings 13 and at least one side channel 14 (e.g. formed as a groove). The at least two through openings 13 connect an inner region of the armature 5 and the side channel 14 and provide a fluid connection between the first port 1 and the third port 3. For example, at least one first through opening 13*a* is formed in the protruding portion 5*a* and at least one second through opening 13*b* in a region 5*b* of the armature 5 that is located axially between the first closure part 7*a* and the second closure part 7*b*. The at least one second through opening 13*b* provides pressure compensation between the inner region of the armature 5 and the third port 3. The second through opening(s) 13*b* is/are located axially level with the damping spring 8 and, owing to the pressure compensation, reduce wear of the first closure part 7*a* and the second closure part 7*b*.

According to exemplary embodiments, the armature 5 comprises a (partially) closed end face 5*e*, which faces the core 4. For example, the end face 5*e* of the armature 5 forms a cone. Analogously thereto, the core 4 can form an internal cone 4*e* on the side facing the armature 5. This increases a magnetic area. In particular, the internal cone 4*e* of the core 4 and the cone 5*e* of the armature 5 can each form two angled regions. In this way, the end face of the armature 5 forms a completely or partially closed armature surface relative to the pole surface of the core 4. Compared to conventional armatures with slotted pole surfaces, the magnetic force is increased by the larger pole surface according to exemplary embodiments.

The two pole surfaces may be realized in particular as a double cone or by angled regions (see FIG. 1) in order to generate the additional magnetic areas. The two pole surfaces formed in this way additionally increase the area of the armature 5 relative to the core 4 and thus the magnetic force in the event of a larger air gap, since the armature characteristic curve is positively influenced by this geometry.

It is understood that a plurality of passage openings 13 and/or a plurality of side channels may be present in order to distribute the air flows as uniformly as possible to the interior as a result of the considerable pressure conditions. The second port 2 and the third port 3 may be configured as through openings in the valve body housing 10. In the valve body 10, it is optionally possible for the core 4 to also be axially movable, with its axial movement being able to be brought about via a separate controller.

In the exemplary embodiment shown, the second port 2 is closed in the inoperative state (unenergized coil).

Figure 2:
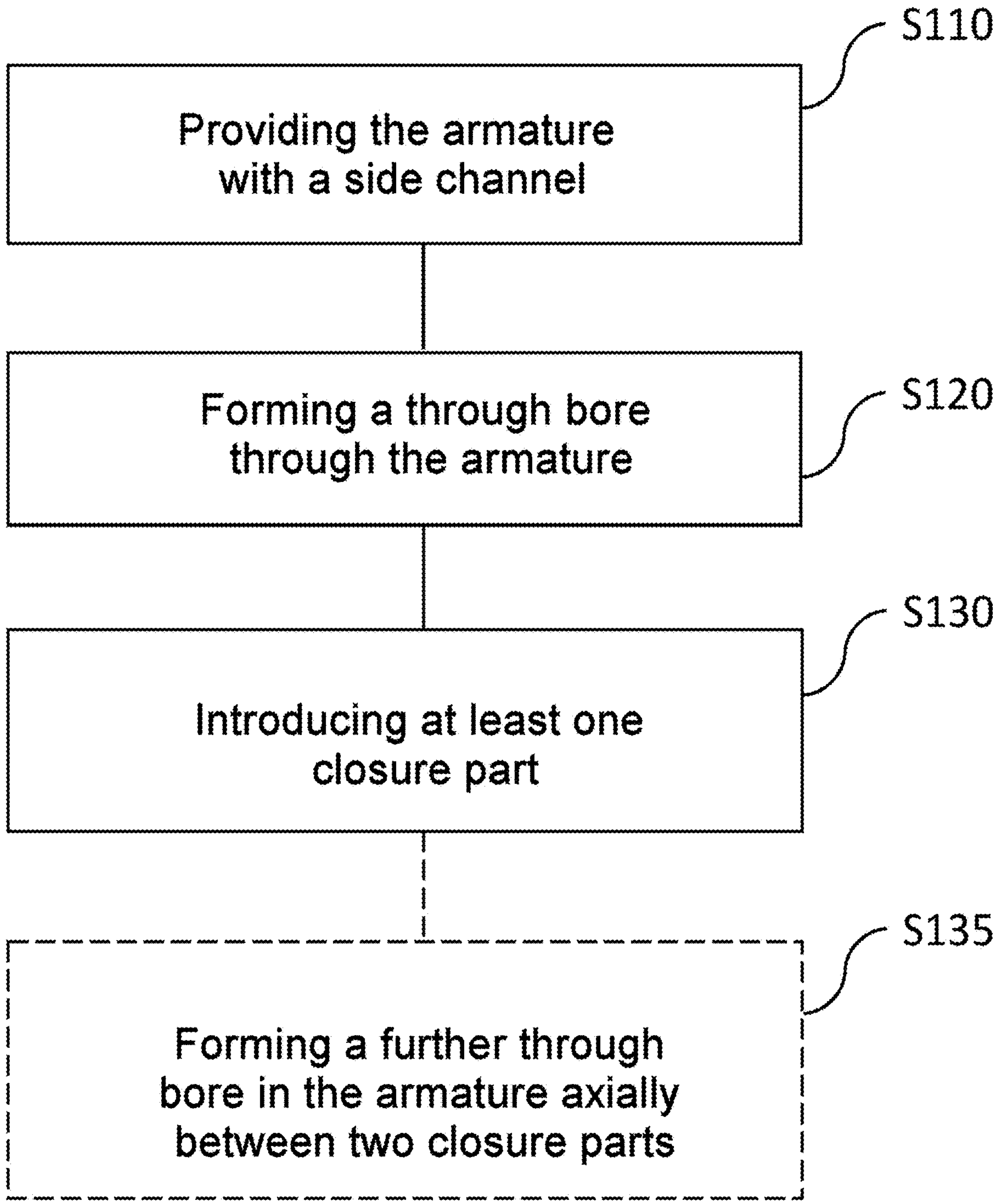
FIG. 2 shows a schematic flow diagram for a method for producing a solenoid valve from FIG. 1.

FIG. 2 schematically shows a flow diagram for a method for producing one of the solenoid valves described previously. The method comprises:

- providing S110 the armature 5 with a side channel 14;
- forming S120 a through bore 13 through the armature 5; and
- introducing S130 at least one closure part 7; 7*a*, 7*b* into the armature.

The steps are carried out in such a way that, after the introducing step S130, the armature 5 has a portion 5*a* protruding axially over the at least one closure part 7; 7*a*, 7*b*, and the through bore 13 is formed in the protruding portion 5*a* in order to conduct an air flow from the first port 1 to the third port 3.

The through bore 13 may be a first through bore 13*a* and the at least one closure part 7*a*, 7*b* may comprise a first closure part 7*a* and a second closure part 7*b*. Optionally, the method can then further comprise forming S135 a second through opening 13*b* in a region 5*b* of the armature 5 that lies axially between the first closure part 7*a* and the second closure part 7*b*.

Optionally, the method comprises, as a further method step, forming S135 a stop for the second closure part 7*b* to ensure fixing of the first closure part 7*a*, the second closure part 7*b* and damping springs 8, arranged in between, within the cylindrical cavity of the armature 5. The forming of the stop may comprise, for example, inserting the disk 9 and edge compression of the armature 5. The disk 9 is then no longer removable from the depression without being destroyed.

It is understood that all of the previously described other features of the solenoid valve can be realized as further optional method steps during the production. It is also understood that the listing sequence is not necessarily a sequence in which the method steps are carried out. The steps may also be carried out in a different sequence or only some of the method steps are carried out The assembly and media conduction can be summarized as follows:

the sequence of the assembly can therefore be undertaken as follows: first of all, the cylindrical armature 5, into which the first closure part 7*a* is inserted, is provided. The first closure part 7*a* comprises a head region and a shoulder region, wherein the radially inwardly projecting protrusions 5*c* of the armature 5 engage on the shoulder region and provide an abutment, so that the first closure part 7*a* is movable only as far as the radial protrusions. The damping spring 8 can then be inserted into the cylindrical armature 5. Subsequently, the second closure part 7*b* is placed onto the damping spring 8. Finally, the disk 9 is inserted. Since the second closure part 7*b* also has a shoulder portion and a head portion, the disk abuts the shoulder region and thus provides a stop for the second closure part 7*b*. For this purpose, the armature 5 comprises the circumferential recess 5*d* into which the disk 9 is insertable. After the compression of the armature 5 at an axial end, it is no longer possible to remove the disk 9 and thus the second closure part 7*b* from the interior of the armature 5, since deformation of the axial end of the armature 5 prevents the disk 9 from being removed. Thereafter, the armature can be inserted together with the core 4 in the interior of the valve housing 10 and, after fixing of the core 9, the solenoid valve is ready for use.

The air movement in the individual switching positions takes place along the through openings 13 and the outer grooves 14. For this purpose, one or more grooves 14 is/are provided along the outer cylindrical surface of the armature 5, which allow an axial air flow into or from the third port 3. The media conduction (air) therefore passes from the first port 1 to the third port 3 through the core valve seat 12 and is guided through the transverse bore 13 in the armature 5. From the transverse bore 13 in the armature 5, the air flow continues via the outer grooves mentioned to the third port 3.

One advantage of this air conduction is that the outer grooves 14 of the armature 5 can already be present in the preliminary material and would not have to be manufactured separately. For example, this may be formed by a turning process even before the production of the armature 5. This saves process time and therefore also costs. The transverse bore 13 in the armature 5 allows air to be conducted from the inside to the outside as well as from the outside to the inside. In addition, the transverse bores 13, which serve to conduct air between the first port 1 and the third port 3, may be structurally identical to the transverse bore 13*b* providing pressure compensation between the first closure part 7*a* and the second closure part 7*b*.

The features of the invention that are disclosed in the description, the claims and the figures may be essential both individually and in any desired combination for implementing the invention.

THE LIST OF REFERENCE SIGNS IS AS FOLLOWS:

1, 2, 3 ports
4 core
4*e* (inner) cone portion
5 armature
5*a*,5*b*,5*c*,5*d*,5*e* portions of the armature
6 coil
7, 7*a*, 7*b* closure part(s)
8 damping spring
9 disk
10 housing body
11 compression spring
12 valve seat (core)
13,13*a*, 13*b* through openings
14 side channel, groove
15 chamber (interior)
17*a*, 17*b* narrowed region (shoulder-head region/portion)

The invention claimed is:

1. A solenoid valve, comprising:

a first port, a second port, a third port, and a core, wherein the first port is a through opening of the core, and the core includes an internal cone;

at least one closure part for opening and closing the first port and the second port, wherein the at least one closure part has a first closure part and a second closure part, and wherein the first closure part couples to an armature and, upon a movement of the armature, opens or closes the first port, and the second closure part couples to the armature and, upon a movement of the armature, closes or opens the second port;

the armature for moving the at least one closure part, wherein the armature extends cylindrically around the at least one closure part; and a coil for moving the armature;

wherein the armature has a portion protruding axially beyond the first closure part in a direction toward the core, wherein the portion protruding beyond the first closure part has a conically tapering end face, which is insertable into the internal cone of the core to conduct a magnetic flux flow.

2. The solenoid valve of claim 1, wherein the end face forms an annularly closed cone.

3. The solenoid valve of claim 2, wherein the internal cone of the core and the conically tapering end face of the armature are each formed by two angled regions.

4. The solenoid valve of claim 1, further comprising:

at least one damping spring, which is arranged between the first closure part and the second closure part and is configured to cushion the closing of the first port and/or the second port.

5. The solenoid valve of claim 4, wherein the armature has a first through opening extending radially through the portion protruding beyond the first closure part, an axially running side channel, and a second through opening in a region, wherein the region is formed axially between the first closure part and the second closure part to provide pressure compensation between an inner region of the armature and the third port.

6. The solenoid valve of claim 5, wherein the first through opening and the second through opening are structurally identical bores.

7. The solenoid valve of claim 4, wherein the first and the second closure part each have a head-shoulder region for closing the associated first or second port, the armature has a protrusion projecting radially into the interior and, at an opposite end, an annular recess with a stop element, and wherein the protrusion forms a stop for the head-shoulder region of the first closure part and the recess is configured to fix the second closure part with respect to the axial direction via the stop element after the first closure part, the damping spring and the second closure part have been inserted.

8. The solenoid valve of claim 7, wherein the stop element is a disk which is fixed within the recess by edge compression of the armature.

9. The solenoid valve of claim 4, wherein the first closure part is structurally identical to the second closure part and only the damping spring is arranged between the first closure part and the second closure part, the damping spring pushing the first closure part and the second closure part away from each other.

10. The solenoid valve of claim 1, wherein the solenoid valve has a chamber into which the armature together with the at least one closure part are linearly movable, and the first, second and third ports provide a connection into the chamber, wherein in an energized state of the coil, the at least one closure part closes the first port and produces a fluid connection between the second port and the third port via the chamber, and wherein in an unenergized state of the coil, the at least one closure part closes the second port and produces a fluid connection between the first port and the third port via the chamber.

11. The solenoid valve of claim 1, wherein the armature has a first through opening extending radially through the portion protruding beyond the first closure part.

12. The solenoid valve of claim 1, further comprising a compression spring between the core and the armature.

13. The solenoid value of claim 12, wherein the portion protruding beyond the first closure part defines a cylindrical inner region in which the compression spring is guided, and which receives a valve seat of the first port.

14. A method for producing a solenoid valve, the method comprising:

providing a first port, a second port, a third port, and a core, wherein the first port is a through opening of the core, and the core includes an internal cone;

providing at least one closure part for opening and closing the first port and the second port, wherein the at least one closure part has a first closure part and a second closure part, and wherein the first closure part couples to an armature and, upon a movement of the armature, opens or closes the first port, and the second closure part couples to the armature and, upon a movement of the armature, closes or opens the second port;

providing the armature for moving the at least one closure part, wherein the armature extends cylindrically around the at least one closure part; and providing a coil for moving the armature;

wherein the armature has a portion protruding axially beyond the first closure part in a direction toward the core, wherein the portion protruding beyond the first closure part has a conically tapering end face, which is insertable into the internal cone of the core to conduct a magnetic flux flow.

15. The method of claim 14, wherein a first through opening is produced in the portion protruding beyond the first closure part which extends radially through the portion protruding beyond the first closure part, and a second through opening is produced in a region of the armature, using the same tool, and wherein the region is formed axially between the first closure part and the second closure part to provide pressure compensation between an inner region of the armature and the third port.

16. The method of claim 14, wherein the first closure part and the second closure part are structurally identical.

* * * * *